May 12, 1925.
M. E. SIPE
1,537,787
PISTON RING
Filed July 9, 1919
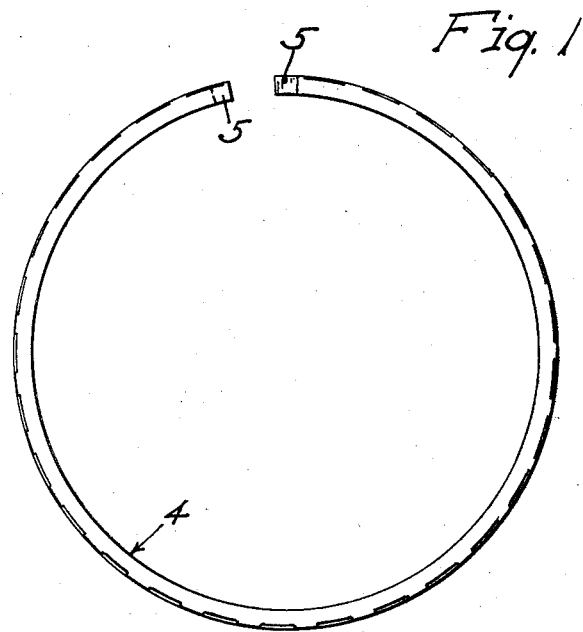
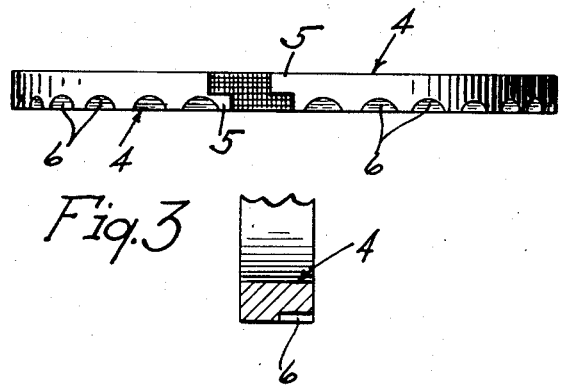
INVENTOR
Martin E. Sipe
BY HIS ATTORNEYS Patented May 12, 1925.

1,537,787

UNITED STATES PATENT OFFICE.

MARTIN E. SIPE, OF RIDGEVILLE, INDIANA, ASSIGNOR TO SEAL-TITE PISTON RING COMPANY, OF MINNEAPOLIS, MINNESOTA, A CORPORATION OF MINNESOTA.

PISTON RING.

Application filed July 9, 1919. Serial No. 309,764.

*To all whom it may concern:*

Be it known that I, MARTIN E. SIPE, a citizen of the United States, residing at Ridgeville, in the county of Randolph and State of Indiana, have invented certain new and useful Improvements in Piston Rings; and I do hereby declare the following to be a full, clear, and exact description of the invention, such as will enable others skilled in the art to which it appertains to make and use the same.

My invention relates to piston rings, and has for its particular object to provide piston rings with improved means for carrying oil to lubricate the cylinder and to make a more gas-tight joint between the cylinder and piston.

The invention is illustrated in the accompanying drawings, wherein like characters indicate like parts throughout the several views. Referring to the drawings:—

Fig. 1 is a side elevation of the improved ring;

Fig. 2 is a plan view thereof; and

Fig. 3 is a fragmentary radial section taken through one of the pockets at the widest portion thereof.

The piston ring 4, at its split end, is preferably formed with the customary transversely reduced lapping end 5, but may be otherwise formed. The invention consists in providing the ring, on its peripheral surface, with circumferentially spaced oil pockets 6 that extend to one side of the ring. These pockets 6 in depth, that is, in a direction radial of the ring, may be very shallow, but in the direction transversely of the ring, they preferably extend about half way across the face of the ring, and in a circumferential direction, they are spaced far enough apart to leave at points between the pockets, good bearing surfaces that are the full radial thickness of the ring. Preferably, the oil pockets are approximately semi-circular and may be thus readily formed by a milling tool.

Fig. 2 shows the ring as it would appear when applied to a piston and the piston is in a cylinder. The ring will, of course, be contracted so that its reduced ends 5 will be overlapped. The ring will be placed in the piston so that its oil pockets 6 will be at that edge that is toward the crank chamber, and hence away from the explosion chamber of the engine.

The oil that is splashed onto the lower surface of the cylinder, will work into the pockets 6 and at the pockets, will be well distributed over the upper portion of the cylinder. It is, of course, well known, that leakage of gas past the piston will be prevented or reduced to a minimum, when a good film of oil is maintained between the cylinder and piston. As already noted, this piston ring has a full width bearing against the cylinder. This bearing, at intervals, is reduced in width, but at points between the pockets, is left full width. This is highly important for several reasons, the most important of which is that it gives a full width bearing working against the cylinder.

With ordinary piston rings, the oil is scraped down from the cylinder wall by the extreme lower edge of the circumference. Consequently, on the downward stroke of the piston, the ring is bearing on the top side of the ring groove, leaving whatever clearance the ring may have in said groove on the bottom scraping edge. In this condition, the surplus oil is forced behind the ring and, in turn, forced through the joint of any open joint ring and up above said ring, finally reaching the head of the piston.

With the oil pocket ring, as outlined, the surplus oil is permitted to enter the pockets and since the pockets are not entirely milled through the radial thickness, the oil cannot go behind the ring to be forced out of the joint. In other words, it makes a recess to receive the surplus oil at a point above the bottom edge and also assists in distributing it on the cylinder wall.

In the use of the oil pockets, I do not remove the entire radial bearing surface from the lower edge surface of the ring, as would be done if a continuous groove were cut around the ring. Thus I obtain at numerous points on the lower edge of the ring and between the pockets, complete bearing surfaces the full maximum radial thickness of the ring, as well as full cylindrical width surfaces at numerous points on the outer circumferential surface of the ring.

Another point is that by making these pockets semi-circular or of circular design, will give additional circumferential scraping edge.

What I claim:—

1. A piston ring provided in its peripheral surface with shallow, approximately semicircular, oil pockets that extend to one edge of the ring, the semi-circular area of said pockets being adapted to face the cylinder wall.

2. A piston ring having a smooth peripheral surface interrupted by and having therein a series of spaced shallow recesses having plane bottom surfaces parallel to the axis of said ring and being substantially semi-circular in form with the diameters thereof disposed substantially at one edge of the ring whereby said recesses extend over an appreciable part of said peripheral surface.

3. The method of forming a piston ring which consists in turning the same to form a smooth peripheral surface thereon and milling the said peripheral surface by an end milling tool, spaced shallow recesses of substantially semicircular shape having one of their diameters approximately at the edge of the ring and forming said recesses with plane bottom surfaces parallel to the axis of the ring.

4. A piston ring having a smooth peripheral surface having therein a series of circumferentially spaced shallow recesses having plane bottom surfaces parallel to the axis of said ring and being semicircular in form whereby the recesses are of variable depth, the peripheral surface of said ring being otherwise smooth and uninterrupted.

In testimony whereof I affix my signature in presence of two witnesses.

MARTIN E. SIPE.

Witnesses:
C. M. BARNES,
RALPH D. WALKER.